United States Patent
Zavesky et al.

(10) Patent No.: US 10,225,369 B2
(45) Date of Patent: Mar. 5, 2019

(54) METHOD AND APPARATUS FOR PROVIDING A RECOMMENDED ACTION FOR A VENUE VIA A NETWORK

(71) Applicant: AT&T Intellectual Property I, L.P., Atlanta, GA (US)

(72) Inventors: Eric Zavesky, Austin, TX (US); Lee Begeja, Gillette, NJ (US); David Crawford Gibbon, Lincroft, NJ (US); Raghuraman Gopalan, Union City, CA (US); Zhu Liu, Marlboro, NJ (US); Yadong Mu, Middletown, NJ (US); Bernard S. Renger, New Providence, NJ (US); Behzad Shahraray, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 282 days.

(21) Appl. No.: 15/171,041

(22) Filed: Jun. 2, 2016

(65) Prior Publication Data

US 2017/0353582 A1 Dec. 7, 2017

(51) Int. Cl.
| | |
|---|---|
| *G06F 15/16* | (2006.01) |
| *H04L 29/08* | (2006.01) |
| *H04L 12/26* | (2006.01) |
| *H04W 4/90* | (2018.01) |

(52) U.S. Cl.
CPC .......... *H04L 67/327* (2013.01); *H04L 43/16* (2013.01); *H04L 67/125* (2013.01); *H04W 4/90* (2018.02)

(58) Field of Classification Search
CPC ....... H04L 4/90; H04L 67/104; H04L 67/327; H04L 43/16
USPC ......................................... 709/205
See application file for complete search history.

(56) References Cited

U.S. PATENT DOCUMENTS

| | | | |
|---|---|---|---|
| 7,113,086 | B2 | 9/2006 | Shorrock |
| 8,086,480 | B2 | 12/2011 | Deo et al. |
| 8,914,399 | B1 | 12/2014 | Paleja et al. |
| 9,082,123 | B2 | 7/2015 | Deo et al. |
| 9,241,242 | B2 | 1/2016 | Cheng et al. |
| 2013/0185355 | A1 | 7/2013 | Tseng et al. |
| 2013/0233933 | A1 | 9/2013 | Dostmann |
| 2014/0032358 | A1 | 1/2014 | Perkowitz et al. |
| 2014/0221020 | A1 | 8/2014 | Xie et al. |
| 2016/0127485 | A1 | 5/2016 | Tseng et al. |
| 2016/0182309 | A1* | 6/2016 | Maturana ............ G06F 17/5009 709/224 |

* cited by examiner

*Primary Examiner* — Frantz B Jean

(57) ABSTRACT

A method and apparatus for providing a recommended action are disclosed. For example, the method receives first data that is measured via at least one sensor deployed at a venue, receives second data from at least one user endpoint device present at the venue, wherein the second data comprises data that is measured via a sensor associated with the at least one user endpoint device, applies a perception model of the venue to the first data and the second data that are received, generates at least one recommended action when a threshold is reached, wherein the threshold is established for generating the at least one recommended action, and provides an update to the perception model of the venue based on the at least one recommended action that is generated.

20 Claims, 3 Drawing Sheets

METHOD AND APPARATUS FOR PROVIDING A RECOMMENDED ACTION FOR A VENUE VIA A NETWORK

The present disclosure relates to a method and apparatus for providing a recommended action for a venue via a communications network, e.g., a communications network of a network service provider or a communications network of an entity associated with the venue.

BACKGROUND

A venue may provide various services to a plurality of users visiting the venue, e.g., a stadium or a concert hall. However, it is often the case that services provided by the operator of the venue do not take into account any inputs from the plurality of users who are present at the venue. For example, the operator may set the environment controls, e.g., HVAC system settings, for the venue without taking any inputs from the plurality of users.

SUMMARY OF THE DISCLOSURE

In one embodiment, the present disclosure teaches a method and apparatus for providing a recommended action for a venue via a communications network, e.g., a communications network of a network service provider or a communications network of an entity associated with the venue. For example, the method receives first data that is measured via at least one sensor deployed at a venue, receives second data from at least one user endpoint device present at the venue, wherein the second data comprises data that is measured via a sensor associated with the at least one user endpoint device, applies a perception model of the venue to the first data and the second data that are received, generates at least one recommended action when a threshold is reached, wherein the threshold is established for generating the at least one recommended action, and provides an update to the perception model of the venue based on the at least one recommended action that is generated.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
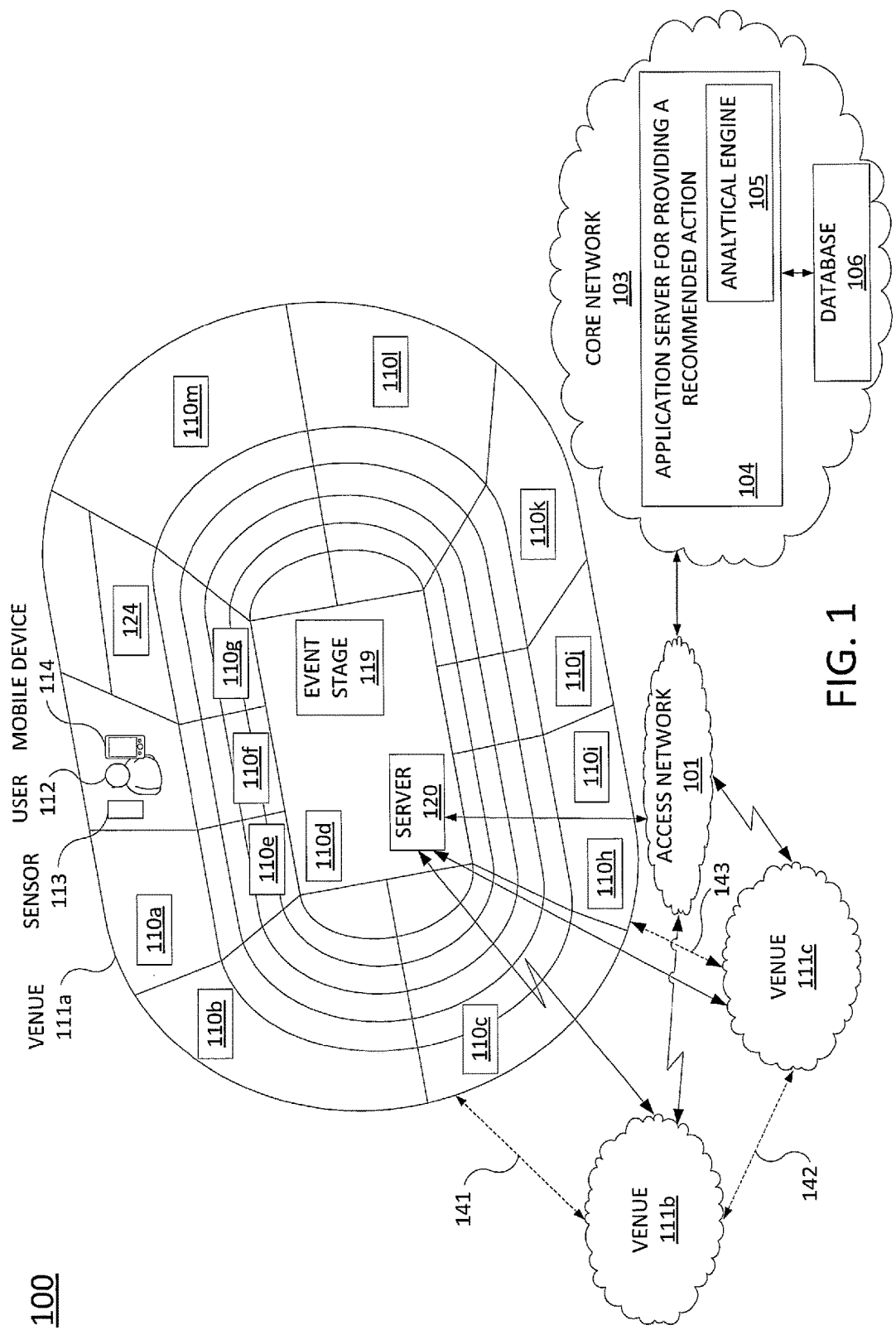
FIG. 1 illustrates an example network related to the present disclosure.

An interactive agent may be deployed to assist an end user in performing certain actions. Prior to performing any action, the interactive agent makes a determination as to whether the action is to be performed. The determination of whether the action is to be performed can be made via a perception model of the interactive agent that makes the determination based on an analysis of data gathered, e.g., via sensors. Thus, the effectiveness or appropriateness of the recommended action by the interactive agent is integrally tied to the accuracy of the analysis.

The present disclosure relates to a method and apparatus for providing a recommended action for a venue via a communications network, e.g., a communications network of a network service provider or a communications network of an entity associated with the venue. The teachings of the present disclosure may be applied via any type of wired or wireless communications network.

In order to clearly illustrate the teachings of the present disclosure, the following terminology will first be described:

Venue;

Internet of Things; and

Sensor.

In one embodiment, a venue refers to a physical location where a public gathering may occur. For example, the venue may be an entertainment venue (e.g., a stadium, a concert hall or an arena), a transportation hub (e.g., a train station, an airport, a bus terminal, etc.), a work venue (e.g., an office building, an office complex, etc.) and the like. In one embodiment, the venue of the present disclosure comprises an enclosed or restricted venue, e.g., a stadium or arena where guests enter via designated entryways. In one embodiment, the venue of the present disclosure may comprise a semi-enclosed venue, e.g., a train station, a bus terminal, etc. However, a venue is not simply an open geographical area without any restriction and/or control related to an entry into and/or an exit from the geographical area. For example, an entire city or an open field would not be a venue, but a stadium where people gather for a purpose (e.g., to attend a game or an entertainment event) would be a venue.

In one embodiment, Internet of Things (IoTs) refer to devices that have the ability to send and/or receive data without requiring a human-to-human or a human-to-computer interaction. IoTs include necessary electronics, software, and network connectivity to collect and exchange data. For example, the IoTs may have Internet Protocol (IP) addresses for Internet connectivity.

In one embodiment, a sensor refers to a device that detects or measures an event or a change and provides an output that indicates the event or the change that is detected. There are a great number of different types of sensors. For example, the sensor may be for sensing biometric information, e.g., a body temperature, a heart rate, a blood pressure, etc. or for sensing environmental information, e.g., temperature, humidity, wind condition, etc. For example, a thermometer is a sensor for detecting a temperature, a carbon monoxide monitor is a sensor for detecting a carbon monoxide level, a speedometer is a sensor for sensing the speed of an object, etc. A sensor may be implemented as an IoT device, e.g., a sensor detects or measures an event and transmits data associated with the detected event.

As described above, an interactive agent may be deployed to assist an end user. The interactive agent may be described as a software that is capable of accomplishing a task without a human or a host invoking steps to accomplish the task. Thus, the interactive agent has built-in intelligence that enables the interactive agent to act with at least some autonomy. However, in order to assist the end user, the interactive agent would need to have the capability to determine whether an action is to be performed on behalf of the end user.

One approach for determining whether there is an action to be performed is by analyzing data using a perception model associated with an interactive agent of the venue. For an illustrative example, suppose the interactive agent is for controlling a quality of indoor air in a venue. The perception model may determine that an adjustment to a temperature is needed. Then, the action may comprise making an adjustment to a setting of a heating, ventilating, and air conditioning (HVAC) system to affect a change to the temperature in the venue. However, this basic approach lacks the ability to aggregate sensor data gathered by other interactive agents and/or user endpoint devices. For instance, a user attending an event at the venue may bring his/her user endpoint device, e.g., a mobile device having a sensor, e.g., a smart phone with an internal or external temperature sensor. The sensor may be for sensing biometric information or environmental information, which is in turn transmitted to the mobile device of the user for storage. For example, the sensor may be transmitting sensed information while being attached to a wristband that is worn by the user. Then, the mobile device of the user may receive an input (e.g., the sensed biometric information or environmental information) from the sensor.

As the number of users of mobile devices and sensors continue to grow, a large number of mobile devices and a large number of sensors may be physically present at the venue. However, an action to be taken that is determined by the interactive agent of the venue has not accounted for data gathered by other sensors that are associated with users who are attending an event held at the venue. Taking an action by the interactive agent of the venue without the benefit of accounting for data gathered by other sensors that are associated with users who are attending an event held at the venue, may produce a condition at the venue that is inconsistent with the desires or wishes of the attending users. For instance, the interactive agent of the venue may take an action to lower a temperature setting in the venue, even when sensors associated with users in the venue indicate that the temperature may be too low, e.g., gathered biometric information of the attending users may indicate that the users collectively are generally cold and would like the temperature at the venue to be increased instead.

In one embodiment, the present disclosure describes a method for providing a recommended action for a venue based on aggregated data from various sources. For example, the aggregated data may be data gathered via sensors associated with the interactive agent of a venue (e.g., a "current" venue), via sensors associated with user endpoint devices (e.g., mobile devices) present in the current venue, and via other interactive agents, e.g., interactive agents of other venues different from the current venue.

In one embodiment of the present disclosure, the present method provides the recommended action for the venue via a communications network of a network service provider. For an illustrative example, the network service provider may provide a service for providing recommended actions to subscribers who operate or manage the venues. In one embodiment, the subscribers may be operating entities associated with venues. The service provider may then implement the service to the subscribers via an application server deployed in the network of the network service provider. The recommended actions may be for making a change to the venue (e.g., making a change to a stadium), for improving a service provided by the venue (e.g., entertainment, food and beverage service, etc.), and for improving delivery of services to the venue (e.g., delivery of emergency services by police and fire departments and/or an ambulance service). For example, a "local" or "venue-based" application server deployed at the venue may receive the recommended actions from the network service provider. In response to the recommended actions, the "local" or "venue-based" application server may implement the recommended actions, e.g., provisioning more food items or drink items, sending a request for an emergency service, and the like. In other words, the recommended actions can be implemented via machine to machine communications.

In one embodiment of the present disclosure, the present method provides the recommended action via a communications network to an entity associated with the venue. For an illustrative example, the entity associated with the venue may implement the method of the present disclosure in its own network, e.g., an enterprise local area network. In turn, the entity associated with the venue may deploy the interactive agent in a server located in the local area network of the entity. A perception model of the interactive agent may then analyze the data and generate a recommended action. The recommended action may be provided to a server of the entity associated with the venue. In turn, the server associated with the venue may directly execute the recommended action or dispatch personnel to act on the recommended action.

The interactive agent may interact directly with other devices, e.g., controllers, environmental systems, security systems, etc. For example, suppose a recommended action is to activate a video camera when a motion is detected at a location (i.e., to record an event). Then, the interactive agent may interact with sensors for receiving an input when a motion is detected at the location. When an input is received from a sensor indicating that a motion is detected for the location, the interactive agent may invoke steps for activating the video camera in the vicinity of the location. In one example, the invoking of the steps may comprise sending a signal directly either to the video camera or to a controller of the video camera. Alternatively, the interactive agent may display a notification message on a screen of a security station to alert security personnel.

In one embodiment, the interactive agent may be deployed on a software application. In other words, the interactive agent may be hosted on another software application. For an illustrative example, an interactive agent may be deployed on a software application that controls a Heating, Ventilation and Air Conditioning (HVAC) system which is deployed to control an environment. The interactive agent may then provide some intelligence for controlling the environment. For example, the interactive agent may be for: analyzing data gathered via one or more sensors, and performing any number of actions for controlling the HVAC system (e.g., change settings of the HVAC system). In other words, the controlling of the HVAC system is for controlling the environment based on the analysis of the data gathered via the one or more sensors.

In one embodiment, an interactive agent may be deployed on a hardware device, e.g., a server, a mobile device, a traffic signal, etc. The interactive agent deployed on the hardware device may then assist the end user by performing actions associated with the hardware device or actions controlled/invoked by the hardware device. For instance, suppose the hardware device is a mobile device and the action is to add an entry in a calendar. Then, the interactive agent deployed on the mobile device may assist the end user by adding the entry, e.g., automatically adding an appointment. In another example, suppose the hardware device is a traffic signal and the action is controlling the speed of traffic on a road based on a weather condition. Sensors may be used for determining the weather condition. In turn, the interactive agent deployed on the traffic signal may slow down or speed up traffic by controlling the duration of the displayed "red"

signal, "yellow" signal and "green" signal of the traffic signal in accordance with the weather condition.

In one embodiment, each sensor has at least one way to provide the data that is captured by the sensor to a server, e.g., an application server of the network service provider, or a server of an entity associated with the venue. The sensor may be an IoT device. Hence, the sensor may communicate with other IoT devices and servers via a communication network, e.g., the Internet.

In one embodiment, a sensor may transmit the data captured by the sensor directly to the server of the entity associated with the venue or the application server of the network service provider. For example, the sensor may have an ability to communicate via an access network, e.g., a Wireless-Fidelity (Wi-Fi) network, a cellular network (e.g., 2G, 3G, and the like), a long term evolution (LTE) network, an enterprise local area network, and the like.

In one embodiment, a sensor may be associated with a user endpoint device, e.g., a mobile device such as a smart phone. In one embodiment, the sensor may be a physically separate device that transmits data captured by the sensor to the user endpoint device with which it is associated. For instance, a user may be carrying the mobile device while wearing a wristband that comprises the sensor. In other words, the mobile device may be physically located near the sensor, but the sensor is not integrated with the user endpoint device. Then, the mobile device may receive the data from the sensor, e.g., via a wireless connection (e.g., Bluetooth®, or any other personal area network communication protocols). Subsequently, the mobile device may provide the data that is gathered from the sensor to a server, e.g., an application server of the network service provider or a server of the entity associated with the venue.

In one embodiment, the user endpoint device provides, to a server, the data that is measured via the sensor in a predetermined time interval. In another embodiment, the user endpoint device provides the data that is measured upon receiving a query from the server. For instance, the application server of the network service provider may send a query to the user endpoint device periodically. The user endpoint device may then provide the data as a response to the query.

In one embodiment, the sensor may be a part of the user endpoint device. For example, a smartphone may have a sensor for measuring a temperature near the smartphone. In other words, the temperature sensing may be one of many functions of the smartphone.

As described above, the sensors are used for measuring data that is to be analyzed for making a determination as to whether a recommended action is to be generated. In order to make proper use of the data, a perception model is built for the interactive agent of the venue. Accordingly, in one embodiment, the method of the present disclosure receives, for the venue, a perception model and/or an update to a perception model from at least one other venue. For example, there may be other venues that have interactive agents and are generally similar to the current venue, e.g., the current venue and the other venues are all baseball stadiums, large airports, bus depots, stores of a particular corporate chain, etc. Thus, a perception model can be reused for similar venues that share similar physical or environmental characteristics or similar operating requirements.

The other venues may also have any number of sensors. In one embodiment, the perception models of the other venues may then also provide inputs that may be beneficial for the perception model of the current venue. For example, the perception model of the current venue may comprise a learning method that enables the perception model to learn not only from data gathered via sensors in the current venue (i.e., itself) but also from data gathered via sensors at the other similar venues. In addition, the perception model of the venue may learn from recommended actions that are generated by interactive agents of the other venues.

To illustrate by way of an example, suppose a first venue is used for baseball games. Suppose also there are ten other similar venues used for baseball games. The perception model may learn behavior patterns of baseball audiences from an analysis of data gathered via sensors of the first venue and sensors of the other ten venues used for baseball games. For instance, the perception model may learn one or more of: an average of 16 ounces of beverage is purchased per guest, 80% of guests will leave the game in the $8^{th}$ inning, 2% of guests will leave the game in the $9^{th}$ inning, 50% of rest room facilities are unoccupied when a difference of scores is less than four runs in the $9^{th}$ inning of a game and the venue has one rest room for every 50 guests on average per game, 90% of the rest room facilities are fully occupied during the $7^{th}$ inning regardless of the score when the venue has one rest room for every 50 guests on average per game, etc.

In one embodiment, the update to the perception model is received from a venue of the at least one other venue in a predetermined time interval. For example, venues may exchange updates in a predetermined time interval, e.g., daily, weekly, monthly, etc.

In one embodiment, the update to the perception model is received from at least one venue of the other venues as a response to a query for the update that is sent by the current venue. For the example above, the first venue in which the baseball game is held may send a query to a second venue. The second venue is one of the ten other venues in which similar baseball games are held. A response to the query may then be received from the second venue. Similarly, an update to the perception model may be received from any of the other venues.

In one embodiment, the method of the present disclosure receives, for at least one sensor in the venue, data that is measured via the sensor. For example, the venue may have a sensor for determining a location of a guest, a sensor for determining whether an indoor air quality associated with the venue is normal, a sensor for determining when an event held at the venue is entertaining the guest or guests (e.g., a camera or video camera capturing facial expressions of guests or a noise or volume meter to measure cheering of guests), a sensor for determining when concession and/or rest room facilities are meeting the needs of guests, a sensor for measuring a noise level in the venue, a sensor for measuring a luminance or lighting level, a sensor for determining whether a display (e.g., a Jumbo Tron) in the venue is displaying content in accordance with the needs of guests, a sensor for determining whether a criterion for a safety service in the venue is satisfied, a sensor for assessing a need for an emergency service, a sensor for assessing the ease for delivering an emergency service or a safety service to the venue (e.g., moving guests from one location to another location of the venue, turning on safety lights, closing a stadium dome cover due to a pending storm, opening or closing gates or doors, evacuating the venue, summoning of an emergency service such as first responder services, etc.). Then, data measured via any number of these sensors described above may then be received. It should be noted that these sensors are only illustrative and should not be interpreted to be a limitation of the scope of the present disclosure.

In one embodiment, the method of the present disclosure receives, from at least one user endpoint device in the venue, data that is measured via a sensor associated with the at least one user endpoint device, e.g., a mobile device. For example, a user may be a guest of the venue and is carrying his/her mobile device. In addition, a sensor may be associated with the user endpoint device. For instance, the user may be wearing a biometric sensor to measure his/her heartrate, a sensor to be placed near the user to measure a temperature in the vicinity of the user, a sensor to be placed near the user to measure a noise level near the vicinity of the user, etc. When the sensors that are associated with the user endpoint device are not already integrated into the user endpoint device, the sensors may then communicate with the user endpoint device of the user, e.g., a smart phone, to provide the sensed information to the user endpoint device of the user. In turn, a server may receive the sensed information from the user endpoint device, e.g., the smart phone. When the sensors that are associated with the user endpoint device are integrated into the user endpoint device itself, then the user endpoint device simply measures and stores the sensed information or data to be transmitted at a later time. Hence, there is no need for transmission between the sensor and the user endpoint device.

In one embodiment, the method applies a perception model of the venue to the data that is received. The data that is received comprises one or more of: data that is measured via at least one sensor of the current venue, data that is measured via at least one sensor of another venue, and data that is gathered via at least one sensor associated with a user endpoint device in the current venue. As described above, a perception model and/or an update to a perception model may be received from any number of other venues. For example, the perception model may be trained when either a perception model or an update to a perception model is received. For example, when a new stadium is being built, the perception model associated with the interactive agent of the new stadium may be trained using historical data (e.g., sensed information) from other stadiums. In other words, data from other stadiums may be used for initializing the perception model for the new stadium.

In one embodiment, the perception model may be trained offline. For example, the perception model may be trained based on a relatively static data set. For instance, historical data may be used for training offline. In one embodiment, the perception model may be further refined online. For example, as more data (e.g., updates to other perception models, recommended actions, etc.) is received, the perception model of the current venue may be provided with the newly received data. The perception model may then undergo further training using the newly received data.

In one embodiment, the method determines whether a threshold for generating at least one recommended action is reached. Each threshold is uniquely established for generating a respective recommended action. In other words, any number of thresholds may be established for any number of recommended actions. For instance, there may be: a threshold for opening a gate of the venue (e.g., based on temperature, noise level, number of guests on a line, etc.), a threshold for closing a gate of the venue (e.g., reaching a predetermined number of allowed guests), a threshold for evacuating the venue, a threshold for providing additional beverages (e.g., the event is taking place in a particularly hot day), a threshold for providing additional food (e.g., an event may take a longer time period than expected to complete such as a tied baseball game going into extra innings), a threshold for controlling a heating, ventilation and air conditioning system (e.g., adjust temperature, humidity, or air flow), a threshold for notifying a public safety agency (e.g., notifying a police department and/or a fire department), a threshold for activating other sensors (e.g., activating a camera, a light source, a sound source, etc.), a threshold for modifying a location or a direction of a sensor (e.g., changing a camera angle, changing which areas of the venue are well lit, etc.), and the like.

When a threshold for generating the recommended action is reached, the method generates the recommended action associated with the threshold that is reached. For example, when a threshold for generating the recommended action for evacuating the venue is reached, the method generates a recommended action for evacuating the venue, e.g., opening all locked doors and gates simultaneously, turning on emergency lights, activating prerecorded emergency messages via loud speakers, and so on.

In one embodiment, the recommended action comprises an action associated with safety in the venue. For example, there may be a health (e.g., medical) emergency in the venue requiring an ambulance service to be summoned, or there may be a need for a police department or a fire department related emergency service. The recommended action may then be to provide such emergency service. For example, the emergency service may comprise at least one of: a health related emergency service, a police department related emergency service, and a fire department related emergency service.

In another example, there may be a safety concern that requires attention but does not require summoning an emergency service. For instance, one area of the venue may become too crowded and dispersing guests to other areas of the venue may be appropriate, or evacuating the venue temporally may be recommended, e.g., due to a severe passing storm. In another example, suppose the perception model associated with the interactive agent determined that when it is raining, certain locations of the venue may need to be mopped every two hours to reduce accidents. Then, the recommended action may depend on whether rain is sensed, on whether those locations of the venue are occupied, and on whether it has been two hours since a similar recommendation was provided. When a sensor indicates that it is raining, the venue is occupied and it has been at least two hours since the previous recommendation for mopping the floor of the venue, then the interactive agent may provide a new recommended action. For example, the recommended action may comprise "mopping the floor within the next 15 minutes is recommended."

In one embodiment, the recommended action comprises an action associated with a service provided at the venue. For example, a sensor may detect an event that causes a concern with a quality of service provided at the venue. For example, the service provided at the venue may comprise one or more of: a service for providing a food item, a service for providing a beverage item, and a service associated with a restroom facility. To illustrate by way of an example, suppose fixed sensors deployed in the venue detect long lines near concession stands or restroom facilities in one part of the venue while the same services are available without any line at another part of the venue. In one example, the recommended action may encompass displaying a message or an actual image on an electronic display in the venue to direct people to other locations with the shortest lines. For example, the message may indicate "Please use the concession stand in a lower level that currently has a wait time of three minutes." Similarly, an image showing the current waiting line of the concession stand in the lower level can be displayed so that the guests can see for themselves the current state of the waiting line.

In one embodiment, the recommended action may be provided in accordance with the needs of the subscriber or the entity associated with the venue. For instance, for the example above, identifying a portion of the venue with the most foot-traffic, identifying the wet portions of the venue via sensors, identifying a level of wetness for portions of the venue that are identified as being wet, etc. will be very beneficial. However, the recommended action can be further refined to accommodate specific requirements of the entity associated with the venue. In other words, when the entity defines specific needs such as a list of specific portions of the floor that are wet to be quickly identified (e.g., a handicapped section of a stadium), the recommended action may include a list of the specific portions of the floor that are wet. In other words, the recommended action can be customized to address specific requirements of the entity.

In one embodiment, the recommended action comprises an action associated with an event at the venue. For example, the interactive agent may be for determining an enjoyment level for events held at the venue. Then, sensors may be placed in various places in the venue for measuring data related to an enjoyment level. For example, sensors may be placed on seats to determine when the seats are occupied, sensors may be placed in various locations in the venue to determine when guests are cheering, singing along, etc., and sensors may be placed on the floor to sense when guests of the venue are moving about the floor, e.g., dancing, jumping up and down in enjoyment, and so on.

To illustrate by way of example, suppose the event is a concert at a stadium, the various sensors described above may be used to obtain data that may be analyzed by the perception model associated with the interactive agent of the venue to determine whether or not the concert is well received and is entertaining the audience of the concert. When the analysis based on the data indicates that most of the audience is simply sitting down and not singing along, the recommended action may be to modify a program of the event at the venue. For example, a new song that is not being well received may be replaced by another song that is known to have had better audience participation at the same venue or other venues. Thus, the perception model of the venue may provide recommended actions based on experiences in the same and/or other venues.

In one embodiment, the recommended action that is generated is presented on a display device. For example, the recommended action may be displayed on a display device deployed in a stadium. In another example, the recommended action may be displayed for viewing by personnel associated with the venue, e.g., a stadium director. In yet another example, the recommended action may be displayed for viewing by personnel associated with the network service provider. For example, the network service provided may have personnel viewing and acting on the recommended action, when appropriate.

In one embodiment, the method effects the recommended action. For example, suppose the recommended action was to reduce a temperature of the venue, then the method may have generated a recommended action to turn-on an HVAC system. The implementation of the recommended action may encompass turning-on the HVAC system such that the temperature of the venue is reduced. In another example, suppose a sensor sensed an unusual activity in an area of the venue. Suppose also applying the perception model indicates that turning on the lights before capturing images via a camera would improve the quality of the images captured via the camera. Then, the recommended action that is generated may encompass first turning on the lights and then activating the camera for capturing the images. Then, the implementation of the recommended action may comprise first turning on the lights and then activating the camera in accordance with the recommended action that is generated.

In one embodiment, the method updates the perception model. For example, the method updates the perception model in accordance with the recommended action. For example, the method may store the latest recommended actions. The method may also store information in regards to which recommended actions are implemented. The perception model may then be trained (retrained) with the latest updates.

In one embodiment, the method provides updates to one or more perception models associated with other venues. For example, other venues may wish to receive updates for training their respective perceptive models as well.

In one embodiment, the method provides a recommendation to change a physical attribute of the venue. For example, the method may provide a recommendation to change a number of seats in the venue, to change a configuration of seats in the venue, to change entrances and exits to the venue, to change a configuration associated with air flow in the venue, etc.

FIG. 1 illustrates an example network 100 related to the present disclosure. In one illustrative embodiment, the network 100 comprises venues 111a-111c, an access network 101, and a core network 103.

The access network 101 may comprise a Wireless-Fidelity (Wi-Fi) network, a cellular network (e.g., 2G, 3G, and the like), a long term evolution (LTE) network, and the like. The core network 103 may comprise any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 3:
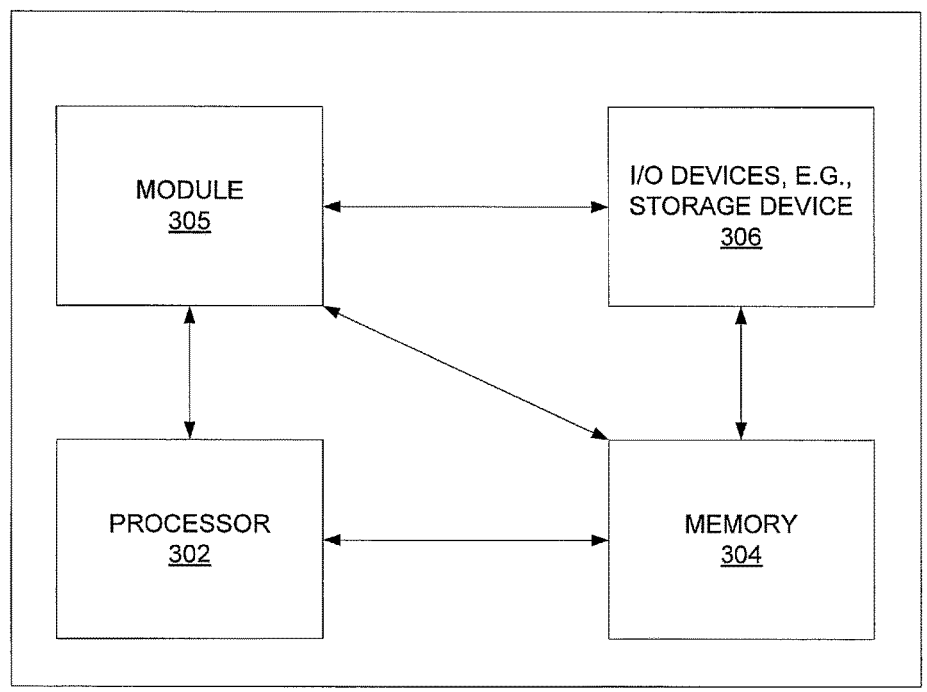
FIG. 3 depicts a high-level block diagram of a computer suitable for use in performing the functions described herein.

In one embodiment, the venue 111a comprises sensor devices 110a-110m, a display device 124, a stage 119 (e.g., an event stage), and a server 120. In one embodiment, the core network 103 may include an Application Server (AS) 104 and a database server 106. In one embodiment, the AS 104 is configured to perform the methods and functions described herein (e.g., the method 200 discussed below). For example, the AS 104 may be deployed as a hardware device embodied as a dedicated server (e.g., the dedicated computer 300 as illustrated in FIG. 3). In other words, the AS 104 is a specialized service or database server configured for providing a recommended action in accordance with the teachings of the present disclosure. The application server 104 may comprise an analytical engine 105. The application server 104 may be communicatively coupled with the database server 106. It should be noted that AS 104 and database server 106 can be implemented together as an integrated system capable of machine to machine communications with the server 120 deployed at the venue. In other words, the AS 104 has the necessary hardware and software interfaces to interact with the server 120 and various user endpoint devices to implement the various embodiments of the present disclosure.

In one embodiment, the database server 106 may be used for storing data gathered from various sources. For example, sensor data may be gathered from venues, e.g., venues 111a-111c, recommended actions and updates to perception models may be gathered from various servers and interactive agents (e.g., server 120), sensor data may be gathered from a sensor associated with a user, e.g., sensor 113, sensor data may be gathered from a user endpoint device, e.g., mobile device 114, and so on. The application server 104 may then access the data gathered from the various sources when performing analysis, generating a recommended action, implementing the recommended action, providing updates for perception models, etc.

In one embodiment, the sensor devices 110a-110m may communicate with the application server 104 via the server 120 and the access network 101. In one embodiment, the sensor devices 110a-110m may communicate with the application server 104 directly via an access network, e.g., via a cellular network or a Wi-Fi access point. A sensor device is said to be communicating directly via an access network when the communication occurs without the use of the server of the venue, e.g., the server 120 of venue 111a.

In one embodiment, a venue 111a, 111b or 111c may transmit a perception model or an update to a perception model to another venue, and receives a perception model or an update to a perception model from another venue, via the application server 104. In one embodiment, communications between the venues 111a, 111b and 111c may use communications paths that do not traverse over a core network of a network service provider. For example, the servers in the respective venues (e.g., server 120) may be used for exchanging perception models or updates to perception models without involving the application server 104. For instance, the venues 111a and 111b may communicate via a communications path 141, the venues 111b and 111c may communicate via a communications path 142, and the venues 111a and 111c may communicate via a communications path 143. In other words, the communications paths 141-143 may be used for transmitting a perception model or an update to a perception model to another venue, and for receiving a perception model of an update to a perception model from another venue. Thus, venue 111a may use the communications path 141 to transmit a perception model or an update to a perception model to venue 111b, and venue 111b may use the communications path 141 to transmit a perception model or an update to a perception model to venue 111a.

Similarly, venue 111a may use the communications path 143 to transmit a perception model or an update to a perception model to venue 111c, and venue 111c may use the communications path 143 to transmit a perception model or an update to a perception model to venue 111a. Similarly, venue 111b may use the communications path 142 to transmit a perception model or an update to a perception model to venue 111c, and venue 111c may use the communications path 142 to transmit a perception model or an update to a perception model to venue 111b.

It should be noted that the network 100 may include additional networks and/or elements that are not shown to simplify FIG. 1. For example, network 100 may include any number of other venues, access networks, etc. In addition, the access network and the core network of FIG. 1 may include additional network elements (not shown), such as for example, base stations, border elements, gateways, firewalls, routers, switches, call control elements, various application servers, and the like. In addition, the venues 111a-111c may include additional equipment (e.g., HVAC systems), sensors, servers, controllers, display devices, etc.

Although a single database is shown in core network 103 of FIG. 1, various types of data may be stored in any number of databases. For instance, various databases, e.g., a database for venues, a database for sensors, a database for recommended actions, a database for updates to perception models, etc., may be used. In addition, various types of data may be stored in a cloud storage. In other words, the network service provider may implement the service for providing equipment maintenance of the present disclosure by utilizing distributed sensor devices and storing data in a cloud storage and/or a centralized server.

In one embodiment, the server 120 is used for implementing the present method for providing recommended actions. In another embodiment, the AS 104 is used for implementing the present method for providing recommended actions. The AS 104 or the server 120 of the present disclosure is for receiving data that is measured via at least one sensor deployed at a venue, receiving data from at least one user endpoint device in the venue, wherein the data comprises data that is measured via a sensor associated with the user endpoint device, applying a perception model of the venue to the data that is received, wherein the data that is received comprises the data that is measured via the sensor deployed at the venue and the data that is measured via the sensor associated with the user endpoint device, generating at least one recommended action when a threshold is reached, wherein the threshold is established for generating the recommended action, and providing an update to the perception model of the venue based on the recommended action that is generated.

Figure 2:
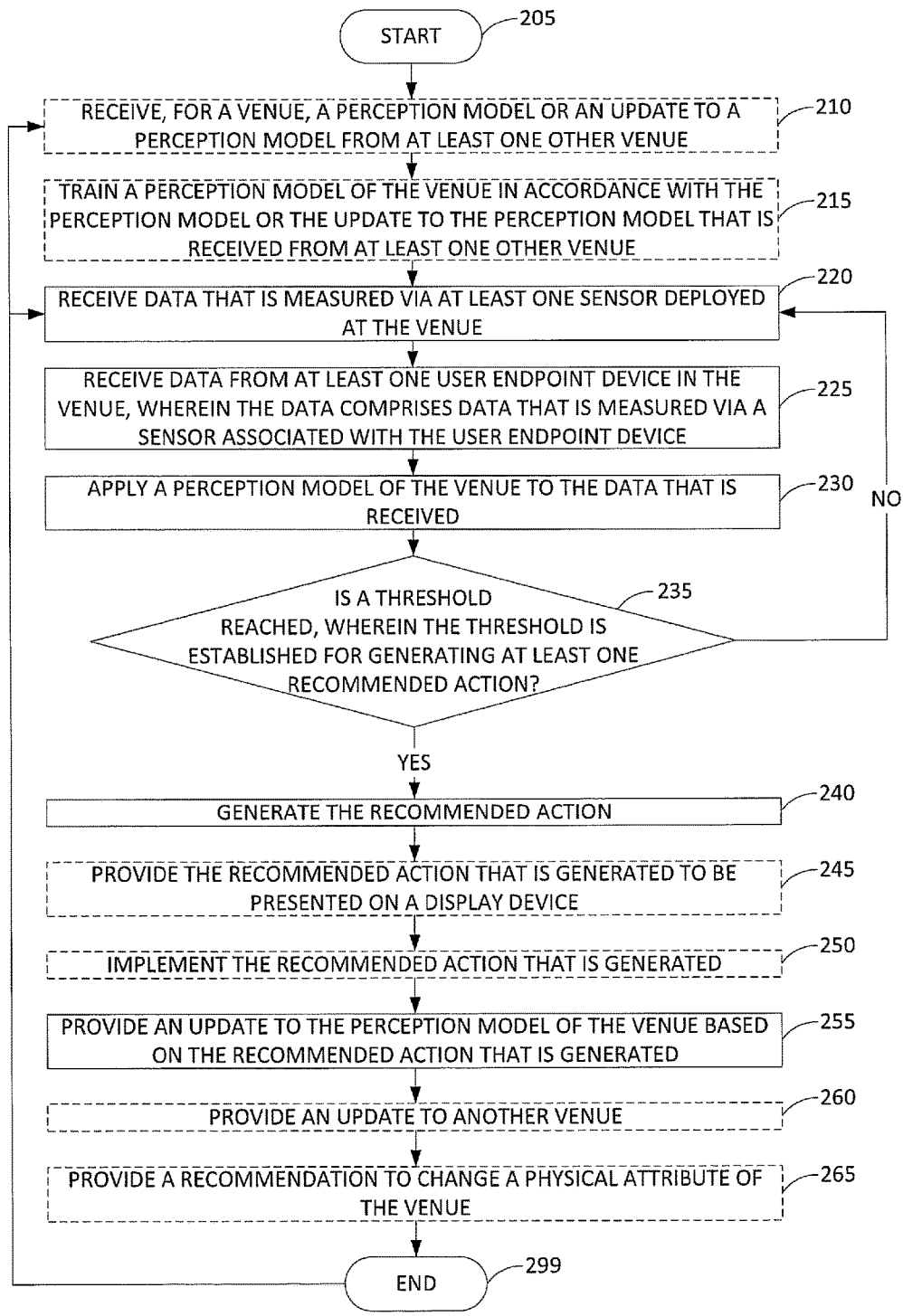
FIG. 2 illustrates a flowchart of an example method for providing a recommended action.

FIG. 2 illustrates a flowchart of an example method 200 for providing a recommended action for a venue in accordance with the present disclosure. In one embodiment, the method 200 may be implemented in an application server, e.g., an application server 104, or the processor 302 as described in FIG. 3. In another embodiment, the method 200 may be implemented in a server of the venue, e.g., a server 120, or the processor 302 as described in FIG. 3.

The method 200 may be implemented for any number of venues and any number of sensors and servers at each venue. For example, the AS 104 may be used for a plurality of venues. For clarity, the flowchart of the example method 200 is described herein for a venue. However, the method may be performed for any number of venues in parallel. The method 200 starts in step 205 and proceeds to step 210.

In optional step 210, the processor receives, for a venue, a perception model or an update to a perception model from at least one other venue. For example, there may be other similar venues that are used in the same capacity as a current venue and historical data from these other similar venues can be used to train the perception model of the current venue. Thus, a pre-processing step for training the perception model of the current venue may be based on any number of perception models or updates to perception models received from other similar venues. For the example described above, a baseball stadium may train its perception model using historical data gathered from other similar baseball stadiums.

In optional step 215, the processor trains a perception model of the venue in accordance with the perception model or the update to the perception model that is received from the at least one other venue. For example, as described above, historical data on sensed information, recommended actions, etc., may be received from other venues. Thus, the perception model or the update to the perception model that is received is that of a venue of the at least one other venue.

In one embodiment, the training of the perception model may be further performed in accordance with an update that is received for the perception model of the current venue.

For example, an update may be received for the perception model of the current venue based on previous recommended actions. The previous recommended actions, sensed information after the recommended actions are taken, etc., may be used to assess the effectiveness of the recommended actions. Thus, the perception model is continuously trained to increase the efficacy of the recommended actions. In other words, the perception model learns from the knowledge as to the effectiveness of previous recommended actions. For example, if the recommended action is to evacuate a particular section of the stadium using Gate A, then the perception model may analyze the data to determine whether such evacuation through gate A was actually effective in quickly directing guests out of that particular section of the stadium. If the data indicates that guests were ignoring the recommendation to use Gate A and instead used Gate B, thereby creating an unnecessary congestion at gate B, then the perception model may alter its recommendation in the future to recommend guests from another different section of the stadium to use Gate A instead.

In step 220, the processor receives data (broadly first data) that is measured via at least one sensor deployed at the venue. For example, any number of sensors may be deployed in the venue for taking measurements and sending data to a server for analysis. The data is to be used for determining whether a recommended action is to be generated and/or implemented for the venue.

In step 225, the processor receives, from at least one user endpoint device "present" at the venue, data (broadly second data) that is gathered via a sensor associated with the user endpoint device. For example, a user, e.g., a guest of the venue, may carry his/her user endpoint device to the venue. A sensor may be associated with the user endpoint device. For example, the sensor may be a biometric sensor on a wrist band that is used for sensing a heart rate. Then, the biometric sensor may sense the heart rate of the user while the guest is attending an event at the venue and send the sensed data to the user endpoint device, e.g., a smartphone, of the user. In turn, the processor receives the data (i.e., the heart rate of the guest) from the user endpoint device. It should be noted that in one example the at least one user endpoint device being "present" at the venue encompasses the scenario where the at least one user endpoint device is physically within the vicinity of the venue, e.g., within the boundary of the venue and/or just immediately outside of the boundary of the venue, e.g., lining up outside of the stadium and the like. In one embodiment, the users of the user endpoint devices may provide their consents before data received from their endpoint devices can be used. For example, the users must "opt-in" to the service before their data will be considered. This allows each user to control if and when his or her data can be used in accordance with the various embodiments of the present disclosure. Alternatively, the users may also "opt-out" of the service as well.

In step 230, the processor applies a perception model of the venue to the data that is received. In one embodiment, the data that is received comprises data that is measured via the sensor associated with the user endpoint device and the data that is measured via the at least one sensor of the venue. For example, the perception model may be applied on data that is received by the processor in steps 220 and 225 from any number of sensors associated with user endpoint devices and any number of sensors of the venue.

In step 235, the processor determines whether a threshold is reached, wherein the threshold is a threshold that is established for generating at least one recommended action. For example, a first threshold may be established for generating a first recommended action for opening the gates of the venue, a second threshold may be established for generating a second recommended action for closing the gates of the venue, a third threshold may be established for generating a third recommended action for lowering an indoor temperature of the venue, a fourth threshold may be established for generating a fourth recommended action for summoning personnel of a police or a fire department, etc. As the examples illustrate, any number of thresholds may be established to provide any number of recommended actions. When the particular threshold of the one or more thresholds is reached, the processer proceeds to step 240. Otherwise, the processor returns to step 220.

In step 240, the processor generates the recommended action. For example, the processor generates the recommended action that is associated with the threshold that is reached in step 235. For the example above, suppose the second threshold is the only threshold that is reached. Then, the processor generates a recommended action for closing the gates of the venue.

In optional step 245, the processor provides the recommended action that is generated to be presented on a display device. For example, venue personnel, guests, etc., may be able to view the recommended action on a display device in the venue.

In optional step 250, the processor implements the recommended action that is generated. For the example above, suppose the second threshold is the only threshold that is reached. Then, the recommended action that is generated is for closing the gates of the venue. The implementing of the recommended action may then comprise invoking actions for closing the gates of the venue. For example, the processor may issue a directive to a controller of a gate of the venue such that the controller sends a signal to the gate in accordance with the recommended action. In another example, the implementing of the recommended action may comprise the processor directly sending the signal to the gate.

In step 255, the processor provides an update to the perception model of the venue based on the recommended action that is generated. For example, the processor may provide data that is gathered via sensors as well as any recommended actions such that the perception model of the venue may be further refined or trained. In other words, in one example as recommended actions are generated, the perception model itself can be retrained based on the underlying conditions that are causing certain recommended actions to be generated, e.g., a greater number of recommended actions related to shortages of food items may indicate a supply chain problem. In another example, the effects of implementing the recommended actions can also be used to retrain the perception model, e.g., using the results of the recommended actions as positive or negative reinforcement to the perception model.

In optional step 260, the processor provides an update to one or more other venues. For example, the processor may update its perception model and notify any number of other venues that the perception model of the venue has been updated. For instance, the processor may provide an update that includes a list of recommended actions.

In optional step 265, the processor provides a recommendation to change a physical attribute of the venue. For example, the processor may provide a recommendation for seating in the venue, for placements of exits and entrances, for placements of routes to the exits and entrances, and for services provided at the venue (e.g., services related to entertainment, concession, ticket purchase, etc.). The processor then proceeds either to step 210 to receive perception models or updates to perception models, to step 220 to continue receiving data, or to step 299 to end the process.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

As such, the present disclosure provides at least one advancement in the technical field of providing recommended actions and/or implementing the recommended actions. For instance, in one example, the present disclosure provides a server and a communication network that is able to analyze data collected from various sensors (e.g., sensors of the venue, sensors associated with user endpoint devices, sensors of other venues) to determine whether a threshold for a generating a recommended action is reached, to generate the recommended action when the threshold is reached and/or implement the recommended action.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for providing a recommended action, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or each of the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 305 for providing the recommended action (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for providing the recommended action (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:
1. A method comprising:
receiving, via a processor of a communications network operated by a network service provider, first data that is measured via at least one sensor deployed at a venue;
receiving, via the processor, second data from at least one user endpoint device associated with at least one user visiting the venue, wherein the second data comprises data that is measured via a sensor associated with the at least one user endpoint device;
applying, via the processor, a perception model of the venue to the first data and the second data that are received;
generating, via the processor, at least one recommended action when a threshold is reached, wherein the threshold is established for generating the at least one recommended action; and
providing, via the processor, an update to the perception model of the venue based on the at least one recommended action that is generated.

2. The method of claim 1, wherein the first data that is measured via the at least one sensor deployed at the venue is received via a server of the venue.

3. The method of claim 1, wherein the at least one recommended action comprises an action associated with a safety service in the venue.

4. The method of claim 3, wherein the action associated with the safety service in the venue comprises an action for evacuating the venue.

5. The method of claim 3, wherein the action associated with the safety service in the venue comprises an action for providing an emergency service at the venue, wherein the emergency service comprises at least one of: a health related emergency service, a police department related emergency service, and a fire department related emergency service.

6. The method of claim 1, wherein the at least one recommended action comprises an action associated with a service provided at the venue.

7. The method of claim 6, wherein the service provided at the venue comprises at least one of: a service for providing a food item, a service for providing a beverage item, and a service associated with a restroom facility.

8. The method of claim 1, wherein the at least one recommended action comprises an action associated with an event at the venue.

9. The method of claim 8, wherein the at least one recommended action is for modifying a program of the event at the venue.

10. The method of claim 1, further comprising:
providing, via the processor, the at least one recommended action that is generated to be presented on a display device.

11. The method of claim 1, further comprising:
providing, via the processor, the at least one recommended action to an application server deployed at the venue.

12. The method of claim 1, further comprising:
providing, via the processor, a recommendation to change a physical attribute of the venue.

13. The method of claim 1, further comprising:
providing, via the processor, an update to at least one other venue.

14. The method of claim 1, further comprising:
receiving, via the processor, the perception model or an update to the perception model from at least one other venue; and
training, via the processor, the perception model of the venue in accordance with the update to the perception model that is received from the at least one other venue.

15. The method of claim 14, wherein the receiving the update to the perception model from the at least one other venue is performed in a predetermined time interval.

16. The method of claim 14, wherein the receiving the update to the perception model from the at least one other venue is performed as a response to a query that is sent to the at least one other venue.

17. The method of claim 14, wherein the perception model is trained offline.

18. The method of claim 1, further comprising:
training, via the processor, the perception model of the venue in accordance with an update that is received for the perception model of the venue.

19. A non-transitory computer-readable storage device storing a plurality of instructions which, when executed by a processor of a communications network operated by a network service provider, cause the processor to perform operations, the operations comprising:
receiving first data that is measured via at least one sensor deployed at a venue;
receiving second data from at least one user endpoint device associated with at least one user visiting the venue, wherein the second data comprises data that is measured via a sensor associated with the at least one user endpoint device;
applying a perception model of the venue to the first data and the second data that are received;
generating at least one recommended action when a threshold is reached, wherein the threshold is established for generating the at least one recommended action; and
providing an update to the perception model of the venue based on the at least one recommended action that is generated.

20. An apparatus of a communications network operated by a network service provider comprising:
a processor; and
a computer-readable storage device storing a plurality of instructions which, when executed by the processor, cause the processor to perform operations, the operations comprising:
receiving first data that is measured via at least one sensor deployed at a venue;
receiving second data from at least one user endpoint device associated with at least one user visiting the venue, wherein the second data comprises data that is measured via a sensor associated with the at least one user endpoint device;
applying a perception model of the venue to the first data and the second data that are received;
generating at least one recommended action when a threshold is reached, wherein the threshold is established for generating the at least one recommended action; and
providing an update to the perception model of the venue based on the at least one recommended action that is generated.

* * * * *